(12) United States Patent
Takata et al.

(10) Patent No.: US 8,066,395 B2
(45) Date of Patent: Nov. 29, 2011

(54) LIGHTING DEVICE FOR DISPLAY DEVICES, LIQUID CRYSTAL DISPLAY DEVICE, AND LIGHT SOURCE LAMP

(75) Inventors: Yoshiki Takata, Suzuka (JP); Katsuaki Yamada, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/632,826

(22) Filed: Dec. 8, 2009

(65) Prior Publication Data

US 2010/0085736 A1 Apr. 8, 2010

Related U.S. Application Data

(63) Continuation of application No. 10/597,030, filed on Jul. 7, 2006, now Pat. No. 7,651,233.

(30) Foreign Application Priority Data

Jan. 8, 2004 (JP) .................................. 2004-003076

(51) Int. Cl.
*G09F 13/04* (2006.01)
(52) U.S. Cl. ................. 362/97.2; 362/97.1; 362/217.05; 362/217.08; 362/217.11; 362/247; 349/70
(58) Field of Classification Search .................. 362/97.1, 362/97.2, 97.3, 217.05, 217.08, 217.09, 247; 349/70
See application file for complete search history.

(56) References Cited

U.S. PATENT DOCUMENTS

| | | | | |
|---|---|---|---|---|
| 5,477,422 | A * | 12/1995 | Hooker et al. | 362/29 |
| 6,679,613 | B2 * | 1/2004 | Mabuchi | 362/600 |
| 7,204,635 | B2 * | 4/2007 | Kimura et al. | 362/628 |
| 7,314,288 | B2 * | 1/2008 | Wakabayashi | 362/97.1 |
| 7,651,233 | B2 * | 1/2010 | Takata et al. | 362/97.2 |

FOREIGN PATENT DOCUMENTS

JP 61-054150 A 3/1986

OTHER PUBLICATIONS

Takata et al.; "Lighting Device for Display Devices, Liquid Crystal Display Device, and Light Source Lamp"; U.S. Appl. No. 10/597,030; filed Jul. 7, 2006.

* cited by examiner

*Primary Examiner* — Stephen F Husar
(74) *Attorney, Agent, or Firm* — Keating & Bennett, LLP

(57) ABSTRACT

A display device comprising: a display panel including a display region; a plurality of light source lamps arranged to emit light toward the display region, each of the plurality of the light source lamps including a folded portion or a curved portion located at least partially outside of the display region and arranged along to an edge of the display panel; and a reflective surface underlying the light source lamps, the reflective surface including a first region with a first reflectance located in an area extending along said edge of the display panel and outside of the display region, and a second region with a second reflectance higher than the first reflectance.

10 Claims, 11 Drawing Sheets

Fig.1-a
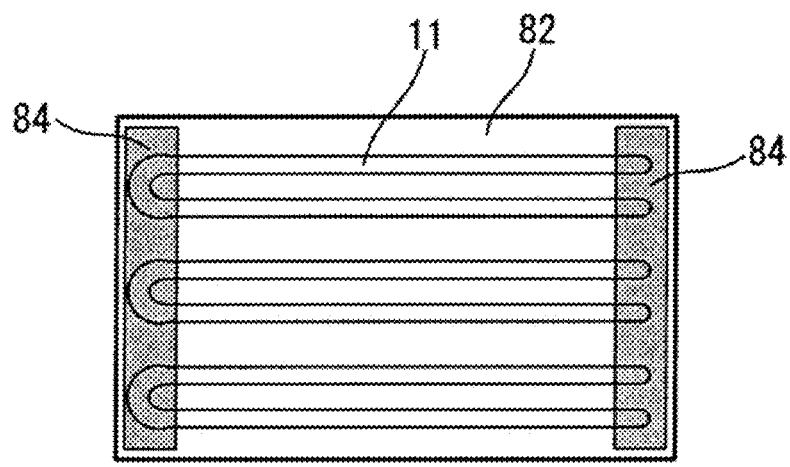
Fig.1-b
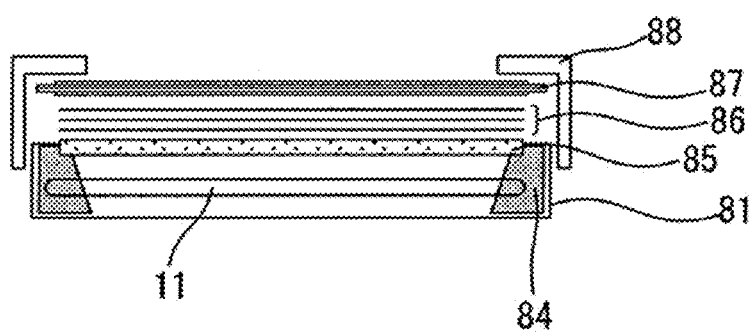

Fig.2-a
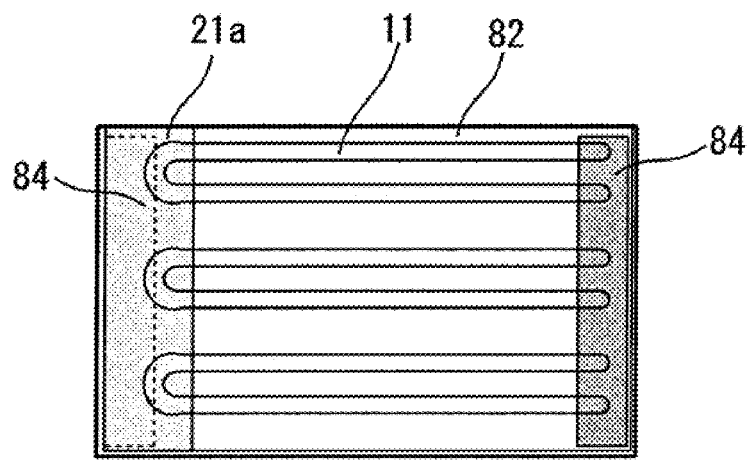
Fig.2-b
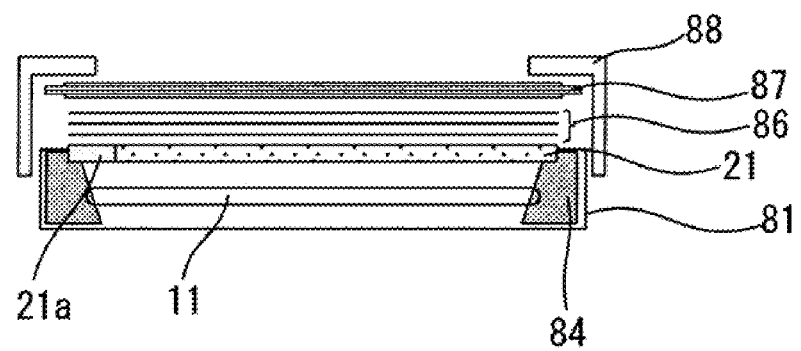

Fig.6-a
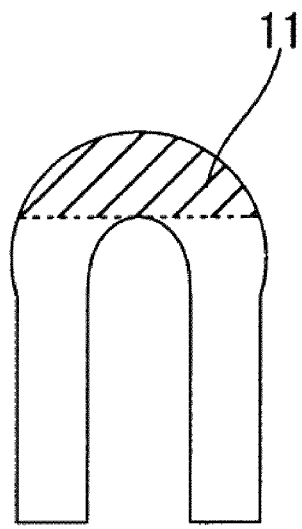
Fig.6-b
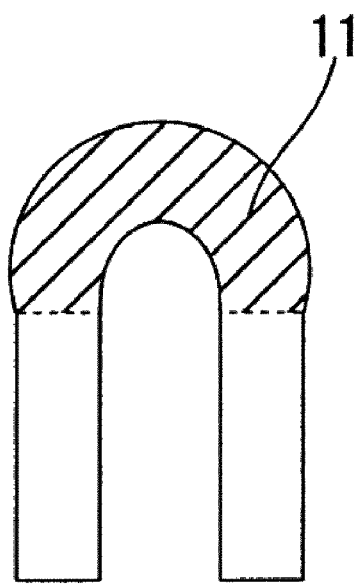

Fig.7-a
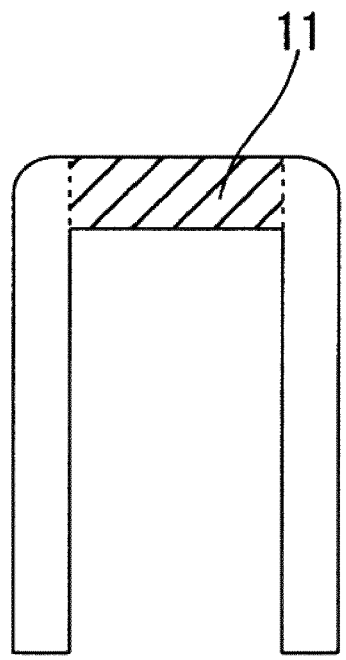
Fig.7-b
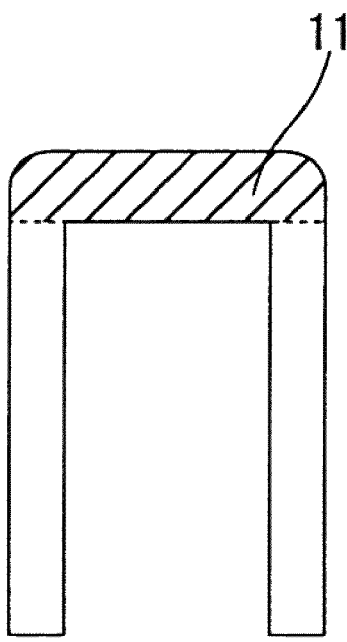

Fig.11-a
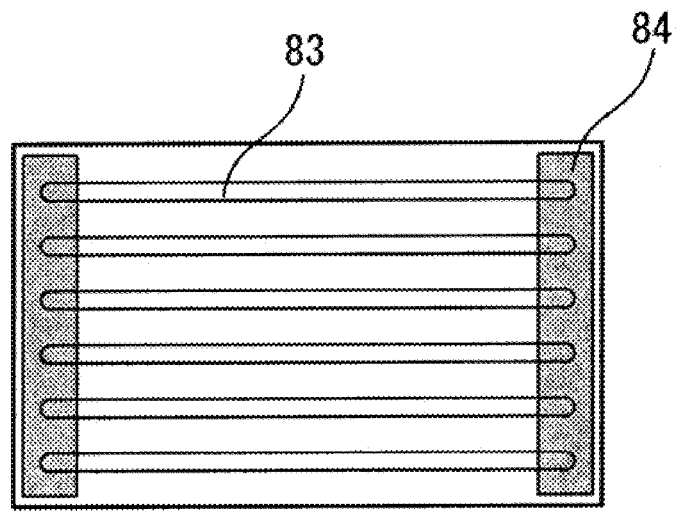
Fig.11-b
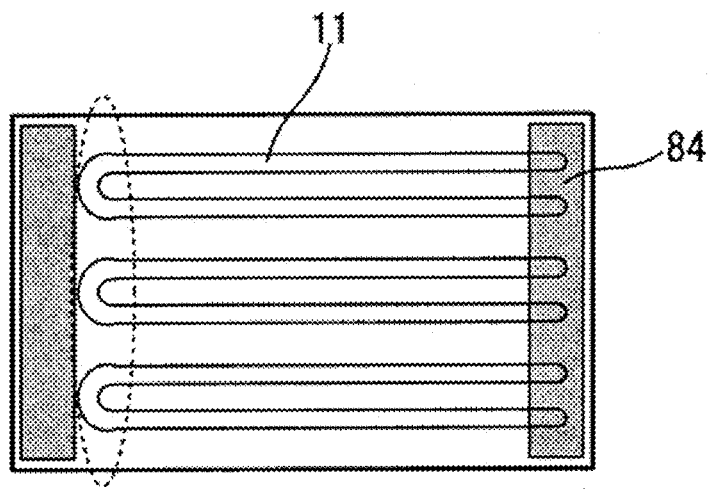

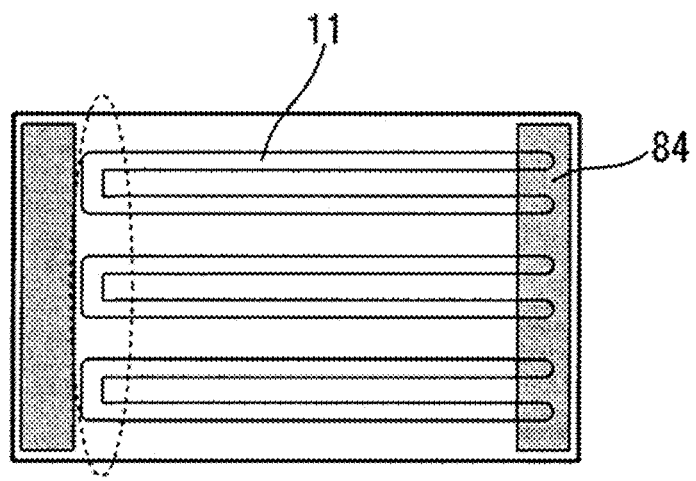
Fig.11-c

LIGHTING DEVICE FOR DISPLAY DEVICES, LIQUID CRYSTAL DISPLAY DEVICE, AND LIGHT SOURCE LAMP

This application is a continuation of U.S. application Ser. No. 10/597,030 filed Jul. 7, 2006, now U.S. Pat. No. 7,651,233.

BACKGROUND OF THE INVENTION

1. Field of the Invention

The present invention relates to a lighting device for display devices, a liquid crystal display device, and a light source lamp. More specifically, the present invention relates to a lighting device for display devices, which is preferably used as a backlight of a transmissive or transflective liquid crystal display device having a transmissive region in a liquid crystal display element. The present invention also relates to a liquid crystal display device including such a lighting device for display devices, and a light source lamp.

2. Description of the Related Art

Lighting devices for display devices are devices for lighting a device having a display that uses light, and have been widely used in backlight parts in liquid crystal display devices, for example. That is, a transmissive or transflective liquid crystal display device generally includes a lighting device for display devices in a backlight part for causing light to enter a liquid crystal panel because liquid crystal panels themselves do not emit light in the liquid crystal display devices. Such liquid crystal display devices are essential for displaying information or image. Products with high quality, fully taking advantage of characteristics of liquid crystal displays, that is, low electric power consumption, lightweight, slim profile, have been recently used in display panels such as monitors for consumer displays, monitors for industrial equipment, and Personal Digital Assistants. In addition, the field of application of such liquid crystal display devices is becoming more and more widespread.

There are currently two types of backlights used in liquid crystal display devices: an edge light type (side light type) and a direct type. In the edge light type, a bar-shaped light source 72 such as cold cathode fluorescent tube is held in a frame 73 and disposed on the side of a transparent plate 71 called a light guide plate, as shown in FIG. 8. In this case, light is made to enter the light guide plate 71 from the light source, and outputted from the inside of the light guide plate 71 through the optical sheet 74 to the liquid crystal panel 75 side by one of a frosting process, printing, prism treatment, or the like. As a result, the liquid crystal display device can be made thinner, but an increase in the light source for increasing brightness directly affects the thickness of a module. The so-called light guide plate 71 gets heavier in a large size of 20 inches or more because a heavy continuum such as acrylic continuum is used.

In the direct type, a plurality of bar-shaped light sources 83, such as cold cathode fluorescent tubes, is provided on the back side of a display element 87 such as a liquid crystal panel, as shown in FIG. 9. In this case, light from the bar-shaped light source 83 is caused to almost directly enter the display element 87. A diffusing plate 85 is often provided between the display element 87 and the light source 83 for eliminating an image of the bar-shaped light source 83. As a result, the direct type backlight has the following advantages: many light sources 83 can be provided; a light amount can be increased; loss of light is small because light is caused to enter the display element 87 directly; and increase in size greater than 20 inches can easily be achieved. However, the number of the light sources 83 increases and thereby the number of components increases. Thereby, the driving circuit of the light source 83 becomes larger. Furthermore, the electric power consumption also increases, and the total amount of heating becomes larger.

Such liquid crystal display devices began to advance in small display elements, and have been widely used as displays for laptop PCs or cellular phones. Thus, the technique has been developed. In these fields, a display size up to about 15 inches is a mainstream size, and reduction in thickness is a required condition. An edge light type has been selected in terms of merchantability. Such liquid crystal display devices currently have become dramatically larger because of completion of a process using a larger mother glass, and thereby have established a position as a household television (20 to 50 inches, for example). For such TVs, brightness is a more important basic performance characteristic than required for PCs or cellular phones. For example, a PC monitor generally has about 250 cd/m$^2$ of specification value, but a brightness specification of 500 cd/m$^2$ or more is needed for TVs. Because of such requirements, a direct type backlight is preferable for providing a large backlight with high brightness.

As conventional lighting devices for display devices, disclosed is a lighting device in which, in a liquid crystal display device using a direct type backlight, a frame side wall in the direction intersecting with a backlight (linear light source) or a frame between the linear light sources is sloped, and thereby reduction in brightness at both end edges of the linear light source is compensated to light a liquid crystal panel with uniform brightness distribution (for example, refer to Japanese Kokai Publication Hei-11-84377, pages 1 to 2). Also disclosed is a lighting structure of a liquid crystal TV in which a U-shaped, S-shaped, or M-shaped fluorescent tube is disposed on the back side of a liquid crystal panel (for example, refer to Japanese Kokai Publication Sho-62-102226, pages 1 to 4).

However, such devices have room for improvement in order to properly correspond to a liquid crystal field and the like, which requires high quality, increased size, and low cost for improvement in merchantability. In addition, such lighting devices have room for improvement, in their structural characteristics, so as to provide advantages in the production thereof by reducing the number of components; to be effective in electric power consumption when applied to a liquid crystal display device; to have high quality and merchantability; and additionally to have improved these properties especially in development of a liquid crystal TV and the like.

SUMMARY OF THE INVENTION

In order to overcome the problems described above, preferred embodiments of the present invention provide a lighting device for display devices which has a reduced number of components and is effective in terms of electric power consumption and can provide excellent display quality; a liquid crystal display device including such a lighting device for display devices; and a light source lamp.

The present inventors have made various investigations about lighting devices for display devices, preferably applied to a backlight of a liquid crystal display device, for example, about large lighting devices for display devices with high brightness. The inventors have firstly noted that a lighting device for display devices, including a light source lamp having a curved portion, such as U-shaped tube, and a light-diffusing layer is effective as a backlight constituting a liquid crystal display device and the like. If a U-shaped tube is used, for example, the number of components of a light source unit is reduced by half because one U-shaped tube corresponds to two straight tubes. Therefore, the number of components can be dramatically reduced. There is a correlation between electric power consumption of a conventionally used cold cathode fluorescent tube and a voltage drop graph, as shown in FIG. 10. Therefore, reduction in the number of electrodes due to the U-shaped tube makes it possible to reduce electric power consumption dramatically. That is, the voltage drop of the cold cathode is mostly determined by the work function of a metal, and therefore reduction in the number of electrodes is effective for reduction in electric power consumption. In this case, one U-shaped tube corresponds to two straight tubes. The number of electrodes is reduced by half although the total length of a light source 83 is the same. If such a lighting device for display devices, including a light source lamp having a curved portion and a light-diffusing layer is used, the lighting device is preferable as a direct type backlight and advantageous particularly for achieving an increase in size.

The present inventors also have noted that the same effect as in the U-shaped tube can be obtained even in a light source lamp having a folded portion, for example, a light source lamp having a structure similar to the U-shaped tube, the structure having two bent portions and a straight portion between the bent portions (hereinafter, also referred to as an "almost U-shaped tube"), other than the U-shaped tube having the curved portion.

A display device in which a straight tube CCFT (Cold Cathode Fluorescent Tube) is used in a direct type backlight and a display device in which a U-shaped tube or an almost U-shaped tube is used in a direct type backlight are compared. In the straight tube, the light source density in the plane of the display device becomes uniform if pitches between lamps 83 are the same as shown in FIG. 11-a, and the light distribution property, which is a property of light diffusion, becomes uniform naturally in the plane. However, in the U-shaped tube or the almost U-shaped tube, display unevenness is generated in a region surrounded by dotted lines, shown in FIGS. 11-b and 11-c. This is because only the region surrounded by the dotted lines has an extraordinarily high light source density and therefore obviously becomes brighter, which leads to display unevenness. Also this occurs because the light sources face lengthwise in the region surrounded by the dotted lines and therefore, the light distribution property is also different from that in other regions, and thereby the region is recognized as having more clear display unevenness if viewing angles are swung and the region is viewed.

Because of the above-described circumstances, the present inventors noted that a lighting device including a light source lamp having a folded portion (curved portion), such as U-shaped tube or an almost U-shaped tube, the light source lamp being preferable in a direct type backlight; and a light-diffusing layer, is preferably used in a display device needed for high quality, such as TV, and that if, in this case, display unevenness can be suppressed enough, such a lighting device can be higher in quality and merchantability. The inventors have discovered that such a lighting device for display devices having a constitution in which at least part of the light generated from the folded portion (curved portion) of the light source lamp is reduced or shielded is preferable. Thereby, the above-mentioned problems have been solved without deterioration of specific advantages of the U-shaped tube, the almost U-shaped tube, or the like, leading to development and completion of preferred embodiments of the present invention.

That is, according to a preferred embodiment of the present invention, a lighting device for display devices includes a light source lamp and a light-diffusing layer, the light source lamp having a curved portion, and at least part of the light generated from the curved portion of the light source lamp is reduced or shielded.

According to another preferred embodiment of the present invention, a lighting device for display devices includes a light source lamp and a light-diffusing layer, the light source lamp having a folded portion, and at least part of the light generated from the folded portion of the light source lamp is reduced or shielded.

A lighting device for display devices according to a preferred embodiment of the present invention includes a light source lamp and a light-diffusing layer. Such a lighting device is preferable as a lighting device for liquid crystal display devices. In the present preferred embodiment, the lighting device for display devices of the present invention is preferably used as a direct type backlight. The lighting device for display devices can be also applied to an edge light type backlight.

A configuration in which a light source lamp is disposed above a reflective sheet with a lamp supporting member disposed therebetween, and the like, is one example of the above-mentioned lighting device in a direct type. One or a plurality of light source lamps may be preferably used in such a configuration. A preferred embodiment of the present invention is preferably applied to a configuration using a plurality of light source lamps. In an edge light type, a configuration in which a light source lamp is disposed on one or two or more sides of a light guide plate made of a transparent resin with a lamp supporting member therebetween is one possible example. In the present description, the terms "or more" and "or less" means that the value described is included.

Fluorescent tubes such as a cold cathode fluorescent tube and a hot cathode fluorescent tube are preferably used as the above-mentioned light source lamp, for example. In various preferred embodiments of the present invention, the light source lamp includes a folded portion (curved portion). A U-shaped light source lamp is preferably used as the light source lamp having a curved portion. In addition, an S-shaped light source lamp or a W-shaped light source lamp may also be used. A light source lamp having a folded portion having two or more bent portions and a straight portion between the bent portions is preferably used. Among them, particularly preferable is a light source lamp having a structure similar to the U-shaped tube, the structure having two bent portions and a straight portion between the bending portions, that is, an almost U-shaped light source lamp (pseudo-U-shaped light source lamp) in which the U-shaped curved portion of the U-shaped light source lamp is replaced with a folded portion having a square U shape similar to the U shape. Due to such configurations, the number of components is reduced and also a total number of electrodes of the light source lamp is reduced. As a result, electric power consumption on the whole of the lighting device for display devices can be reduced. If the U-shaped tube, the pseudo-U-shaped tube, or the like, is used, electrodes of the light source lamp are disposed on one side, which permits aggregation of the drive circuit on one side. On the other hand, if an S-shaped tube, a pseudo-S-shaped tube, or the like, is used, electrodes of the light source lamp are disposed on both sides, which is advantageous for uniformity of the optical property of light outputted from the light source lamp.

A preferable configuration of the above-mentioned light source lamp in view of light uniformity is a configuration in which the straight portion except for the curved portion or the folded portion of the light source lamp is disposed with equally spaced parallel gaps relative to each other in the same plane.

The above-mentioned light-diffusing layer is preferably constituted by a diffusing plate or a diffusing sheet, and provided for eliminating an image of the light source lamp to provide display.

As long as the lighting device of preferred embodiments of the present invention includes these elements, the lighting device may include other constituent elements.

If the above-mentioned lighting device is applied to a liquid crystal display device, the lighting device preferably is generally constituted by disposing a light source lamp above a reflective sheet and laminating and disposing various optical sheets such as diffusing plate, diffusing sheet, condenser lens sheet, polarized light selective reflection/transmission sheet, protective and diffusing sheet, and electromagnetic-shielding sheet (electric conductive sheet, ITO sheet). Then, such a lighting device constitutes a liquid crystal display device together with a liquid crystal panel.

In the lighting device for display devices of various preferred embodiments of the present invention, at least part of the light generated from the folded portion (curved portion) of the light source lamp is reduced or shielded. Thereby, display unevenness attributed to light source density and the light distribution property can be suppressed, and excellent display quality can be obtained without deterioration of specific advantages of the U-shaped tube, the pseudo-U-shaped tube, or the like.

In various preferred embodiments of the present invention, at least part of the light generated from the folded portion (curved portion) of the light source lamp is reduced or shielded. For example, in the curved portion, it is preferable that light is reduced or shielded at a portion outside the top of the inner radius of a curved portion of a light source lamp 11 as shown in FIG. 6-*a*, or at a portion outside the curve beginning of the curved portion of the light source lamp 11 as shown in FIG. 6-*b*. In the folded portion other than the curved portion, it is preferable that light is reduced or shielded at a straight portion between the bent portions of a folded portion of a light source lamp 11 as shown in FIG. 7-*a*, or at both of the bent portions and the straight portion constituting the folded portion as shown in FIG. 7-*b*. The portion which is light-reduced or light-shielded is shown by hatched lines in these figures.

Preferable configurations of the above-mentioned lighting device for display devices preferably include: (1) a configuration in which at least part of the folded portion (curved portion) of the light source lamp is covered with a lamp frame; (2) a configuration in which the lighting device has an optical member provided with a light-reducing or light-shielding treatment on a display side of at least part of the folded portion (curved portion) of the light source lamp; (3) a configuration in which the lighting device has at least part of the folded portion (curved portion) of the light source lamp outside an effective display region; (4) a configuration in which at least part of the folded portion (curved portion) of the light source lamp is provided with a light-reducing or light-shielding treatment; (5) a configuration in which the lighting device has a reflective member provided with a light-reducing treatment on a side opposed to the display side of at least part of the folded portion (curved portion) of the light source lamp. In any of these configurations or combination of these configurations, functional effects of the present invention can be sufficiently exhibited.

The element or method for reducing or shielding light from the folded portion (curved portion) of the light source lamp in the above-mentioned configurations (1) to (5) may be an element or method that is capable of reducing or shielding transmission of light. A resin frame capable of reducing or shielding light and the like, is preferably used if the lamp frame is used, for example. If the optical member is used, the optical member provided with the light-reducing or light-shielding treatment is preferably at least one optical member selected from the group consisting of a diffusing plate, a diffusing sheet, and a lens sheet. That is, preferred elements and methods include a configuration in which the light-reducing or light-shielding treatment is provided for a diffusing plate, a configuration in which the light-reducing or light-shielding treatment is provided for a diffusing sheet, and a configuration in which the light-reducing or light-shielding treatment is provided for a lens sheet. A configuration in which these configurations are combined may also be used. These optical members can be easily provided with the light-reducing or light-shielding treatment. Among them, it is preferable that part of the optical sheet such as a diffusing plate, diffusing sheet, and lens sheet above (on the display side) at least part of the folded portion (curved portion) of the light source lamp is provided with the light-reducing treatment, by being colored for reduction in an amount of light transmission, or by being whitened for light reflection to the light source lamp side. It is also possible to use a configuration in which a member for reducing or shielding light is provided for at least part of the folded portion (curved portion), and a configuration in which a coating material is applied by printing or the like, as a way of providing the light source lamp with the light-reducing or light-shielding treatment, if at least part of the folded portion (curved portion) of the light source lamp is provided with the light-reducing or light-shielding treatment. Among them, it is preferable that the light-reducing or light-shielding treatment has a function of restricting a deformation degree of freedom in the folded portion (curved portion) of the light source lamp. If a member for reducing or shielding light or a coating film formed of a coating material has such a function, for example, the folded portion (curved portion) having the lowest strength can be protected, and breakage of the light source lamp, caused by the deformation, can be avoided. Therefore, handling of the light source lamp can be extremely significantly improved. In the U-shaped tube or the pseudo-U-shaped tube, for example, it is preferable that a light source holder such as a rubber member having a shape covering the U-shaped curved portion or the square U-shaped portion is provided. If the reflective member is used, the reflective member provided with the light-reducing treatment is preferably a reflective sheet, and thereby can be easily provided with the light-reducing or light shielding treatment. If a white reflective sheet for reflecting light from the light source lamp to the display side is used, for example, it is preferable that part of the reflective sheet under (on the side opposed to the display side) at least part of the folded portion (curved portion) of the light source lamp is provided with the light-reducing treatment by being colored for reduction in light reflective amount. It is preferable that the light-reducing or light-shielding treatment is provided by printing in the above-described configurations (2), (4), and (5). The use of printing makes it possible to perform the treatment easily and inexpensively. Further, it is preferable that a gradation in which degree of light reduction is varied, is provided in the light-reducing treatment in the above-described configurations (2), (4), and (5). If the gradation is provided in the light-reducing treatment, more preferable display quality can be obtained. Particularly, the use of printing makes it possible to provide the gradation very easily.

Another preferred embodiment of the present invention provides a liquid crystal display device including the above-mentioned lighting device for display devices. Such a liquid crystal display device is preferably a transmissive or transflective liquid crystal display device in which the use of the light source lamp having the curved portion or the folded portion, such as the U-shaped tube and the pseudo-U-shaped tube, makes it possible for such a liquid crystal display device to have the reduced number of components and to be effective in terms of electric power consumption. In addition, functional effects can be exhibited, for example, display unevenness can be suppressed and excellent display quality can be obtained, without deterioration of specific advantages of the light source lamp such as the U-shaped tube and the pseudo-U-shaped tube; and a structure capable of effectively and simply storing the light source lamp is included. Also, such a liquid crystal display device can be effectively used for display panels, for example, monitors for consumer displays, monitors for industrial equipment, and Personal Digital Assistants.

Another preferred embodiment of the present invention provides a light source lamp used in the above-mentioned lighting device for display devices. That is, the present invention includes a light source lamp designed so as to adapt to the above-mentioned lighting device for display devices, and such a light source lamp exhibits functional effects advantageous in the above-mentioned display device field.

The lighting device for display devices of various preferred embodiments of the present invention preferably has the above-mentioned configuration. The light source lamp preferably includes the folded portion (curved portion). Therefore, the number of components can be reduced, and the number of electrodes also can be reduced, leading to reduction of electric power consumption. At least part of the light generated from the folded portion (curved portion) of the light source lamp is reduced or shielded. As a result, the light source density and the light distribution property are made uniform in the effective display region. Therefore, the display unevenness can be suppressed and a display device excellent in display quality can be provided.

Other features, elements, steps, characteristics and advantages of the present invention will become more apparent from the following detailed description of preferred embodiments of the present invention with reference to the attached drawings.

BRIEF DESCRIPTION OF THE DRAWING

FIG. 1-*a* is a plane view schematically showing a configuration of a direct type liquid crystal display device to which the lighting device according to a preferred embodiment of the present invention is applied, the lighting device having a structure in which at least a portion of the curved portion of the light source lamp is covered with a lamp frame.

FIG. 1-*b* is a cross-sectional view schematically showing the lighting device in FIG. 1-*a*.

FIG. 2-*a* is a plane view schematically showing a configuration of a direct type liquid crystal display device to which the lighting device according to a preferred embodiment of the present invention is applied, the lighting device having an optical member provided with a light-reducing or light-shielding treatment on the display side of at least a portion of a curved portion of a light source lamp.

FIG. 2-*b* is a cross-sectional view schematically showing the lighting device in FIG. 2-*a*.

FIG. 6-*a* is an enlarged plane view schematically showing the curved portion of the light source lamp.

FIG. 6-*b* is an enlarged plane view schematically showing the curved portion of the light source lamp.

FIG. 7-*a* is an enlarged plane view schematically showing the folded portion of the light source lamp.

FIG. 7-*b* is an enlarged plane view schematically showing the folded portion of the light source lamp.

FIG. 11-*a* is a plane view schematically showing essential elements of a direct type backlight using a light source lamp having a straight tube shape.

FIG. 11-*b* is a plane view schematically showing essential elements of a direct type backlight using a light source lamp having a U-shaped tube shape.

FIG. 11-*c* is a plane view schematically showing essential elements of a direct type backlight using a light source lamp having an almost U-shaped tube shape.

DETAILED DESCRIPTION OF PREFERRED EMBODIMENTS

Figure 3:
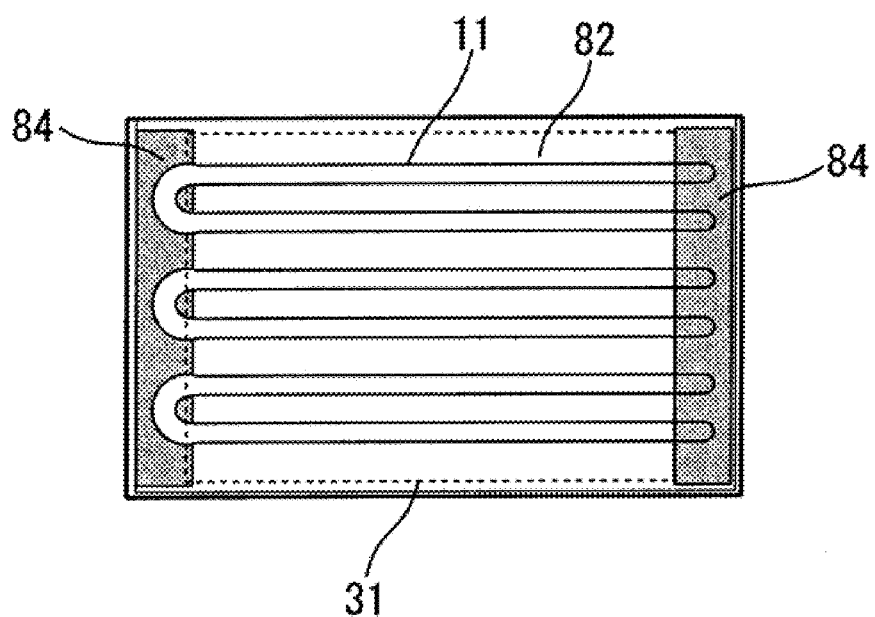
FIG. 3 is a plane view schematically showing a configuration of the lighting device according to a preferred embodiment of the present invention, the lighting device having at least a portion of the curved portion of the light source lamp outside an effective display region.

The present invention will, hereinafter, be described in more detail with reference to preferred embodiments thereof, but the present invention is not limited to the preferred embodiments described below.

FIGS. 1-*a* and 1-*b* each show a configuration in which the above-mentioned preferable configuration (1) of the present invention is applied to a lighting device of a direct type liquid crystal display device. In this configuration, the lighting device for liquid crystal display devices has a structure in which part of or all of a curved portion of a light source lamp 11 is covered with a lamp frame 84 that is capable of reducing or shielding light, and is constituted such that part of or all of the curved portion of the light source lamp 11 is stored in the lamp frame 84 conventionally used.

In this case, the lighting device has a constitution in which the U-shaped curved portion of the U-shaped tube is covered with the lamp frame, and thereby the same optical property as in the case where a straight tube is used can be provided. As a result, the lamp frame 84 reduces or shields light at the U-shaped curved portion of the U-shaped tube without deterioration of specific advantages of the U-shaped tube, and therefore the same light source density and light distribution property as in the straight part of the light source lamp is exhibited. Therefore, the light source density in the plane is made uniform and the light distribution property is also made uniform, which makes it possible to provide excellent display quality.

Examples of a direct type liquid crystal display device constituted by the lighting device for display devices of the present invention include a liquid crystal display device having a structure in which a highly reflective resin 82 is disposed on a sheet metal 81, and thereon a U-shaped tube 11 in which the ends are covered with an insulating resin is disposed using a storage frame (lamp frame) 84, and a diffusing plate 85, and thereon various optical sheets 86 such as diffusing sheet, condenser lens, polarized light selective reflection/transmission sheet, protective and diffusing sheet, and electromagnetic-shielding sheet (electric conductive sheet, ITO sheet), a liquid crystal panel element 87, and a frame 88 are disposed.

FIGS. 2-*a* and 2-*b* each show a configuration in which the above-mentioned preferable configuration (2) of the present invention is applied to a lighting device of a direct type liquid crystal display device. In this configuration, the lighting device preferably has a structure in which the lighting device has an optical member 21 provided with the light-reducing or light-shielding treatment on the display side of part of or all of a curved portion of a light source lamp 11. The optical member 21 provided with the light-reducing or light-shielding treatment may be a diffusing plate, a diffusing sheet, or the like, each provided with a region with low light transmittance 21*a*. Among them, an optical member disposed near the light source is preferable for sufficient light-reducing or light-shielding effect in the oblique direction. The region with low light transmittance 21*a* can be formed by applying white ink to the surface of the optical member 21 on the light source lamp side. In this case, light reflectance to the light source lamp 21 side is high, and therefore, loss of light can be reduced. An opening for light transmission may be provided at part of the region with low light transmittance 21*a*. In this configuration, the optical member 21 is laminated and disposed above the light source lamp 11 such that part of or all of the curved portion of the light source lamp 11 is covered with the part provided with the light-reducing or light-shielding treatment of the optical member 21, and thereby the lighting device for liquid crystal display devices is configured.

In this case, the lighting device has a constitution in which the U-shaped curved portion of the U-shaped tube is covered with the optical member, and thereby the same optical property as in the case where a straight tube is used can be provided. As a result, excellent display quality can be provided without deterioration of specific advantages of the U-shaped tube.

FIG. 3 shows a configuration in which the above-mentioned preferable configuration (3) of the present invention is applied to a lighting device of a direct type liquid crystal display device. In this configuration, the lighting device for liquid crystal display devices is configured to have a structure in which part of or all of a curved portion of a light source lamp 11 is disposed outside an effective display region 31. In this case, the lighting device has a constitution in which the U-shaped curved portion of the U-shaped tube is disposed outside the effective display region, and thereby the same optical property as in the case where a straight tube is used can be provided. As a result, excellent display quality can be provided without deterioration of specific advantages of the U-shaped tube.

Figure 4:
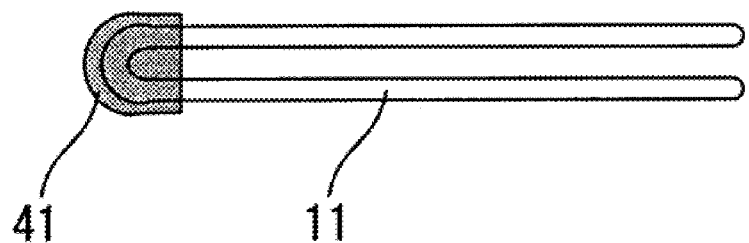
FIG. 4 is a plane view schematically showing a light source lamp in which at least a portion of the curved portion is provided with a member for reducing or shielding light in the lighting device according to a preferred embodiment of the present invention.

FIG. 4 shows a configuration in which the above-mentioned preferable configuration (4) of the present invention is applied to a lighting device of a direct type liquid crystal display device. In this configuration, the lighting device for liquid crystal display devices is configured to have a structure in which a member for reducing or shielding light 41 is provided with part of or all of a curved portion of a light source lamp 11. A member made of a material with low light transmittance, preferably made of an elastic material, is preferably used as the member for reducing or shielding light 41.

In this case, the lighting device has a constitution in which the U-shaped curved portion of the U-shaped tube is covered with the member for reducing or shielding light, and thereby the same optical property as in the case where a straight tube is used can be provided. As a result, excellent display quality can be provided without deterioration of specific advantages of the U-shaped tube. The U-shaped curved portion can be prevented from opening and closing, and the U-shaped tube can be effectively fixed by covering the U-shaped curved portion of the U-shaped tube with the member for reducing or shielding light.

Figure 5:
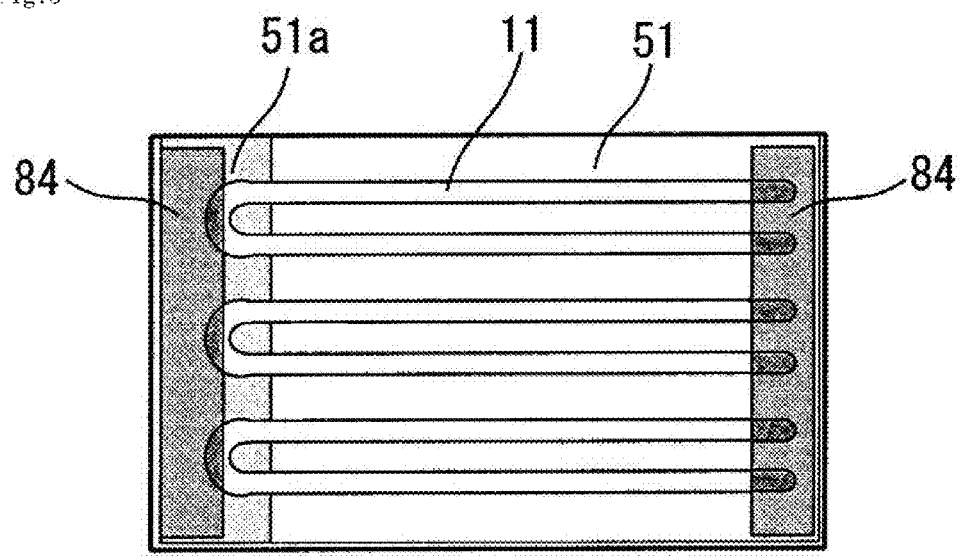
FIG. 5 is a plane view schematically showing a configuration of the lighting device according to a preferred embodiment of the present invention, the lighting device having a reflective member provided with a light-reducing treatment on the side opposed to the display side of at least a portion of a curved portion of a light source lamp.
Figure 8:
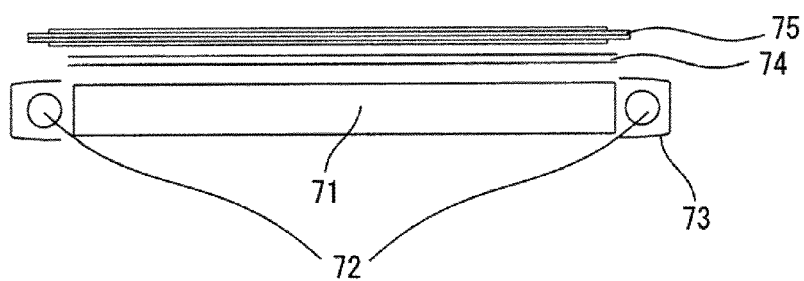
FIG. 8 is a cross-sectional view schematically showing essential elements of a structure of an edge light type backlight.
Figure 9:
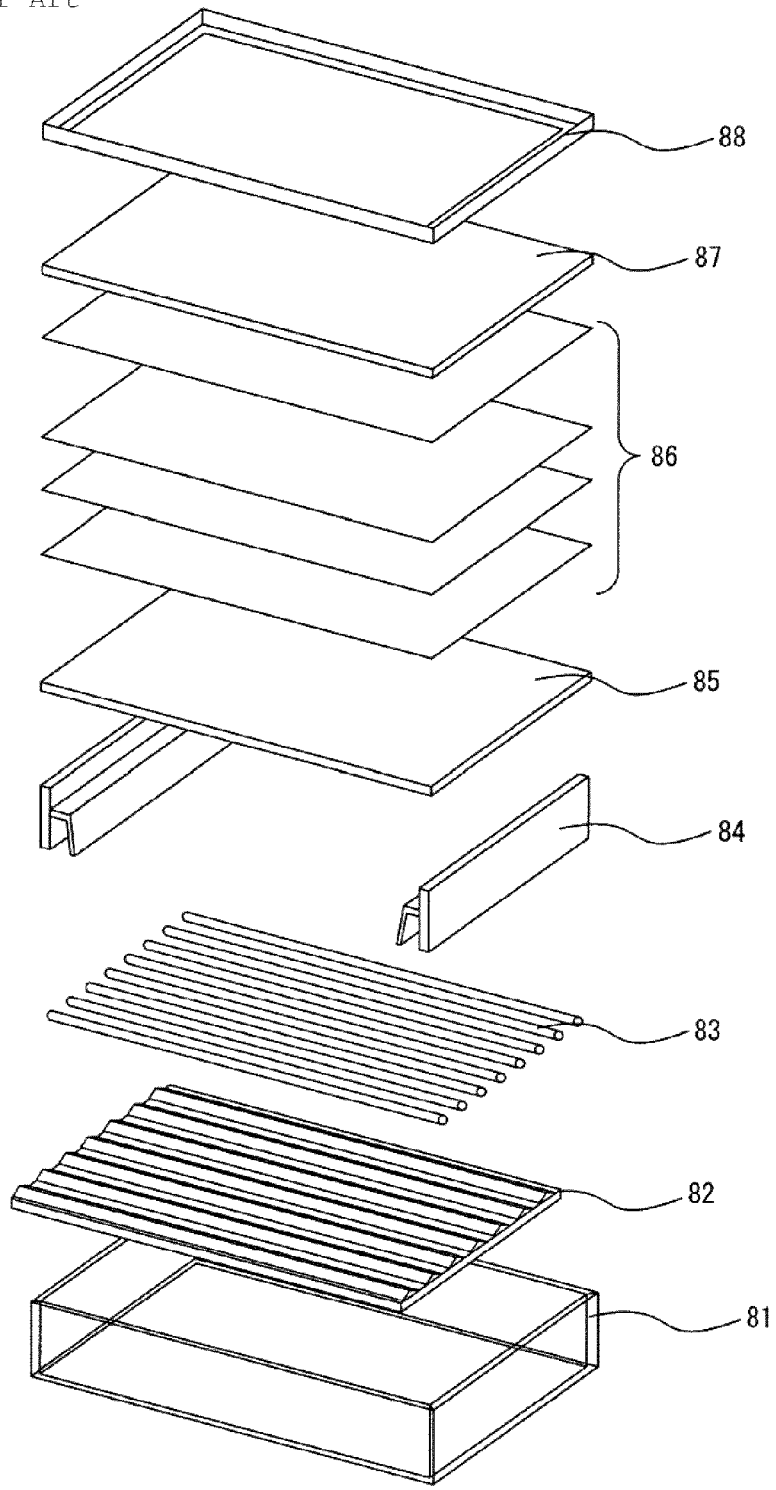
FIG. 9 is an exploded perspective view schematically showing essential elements of a structure of a direct type backlight.
Figure 10:
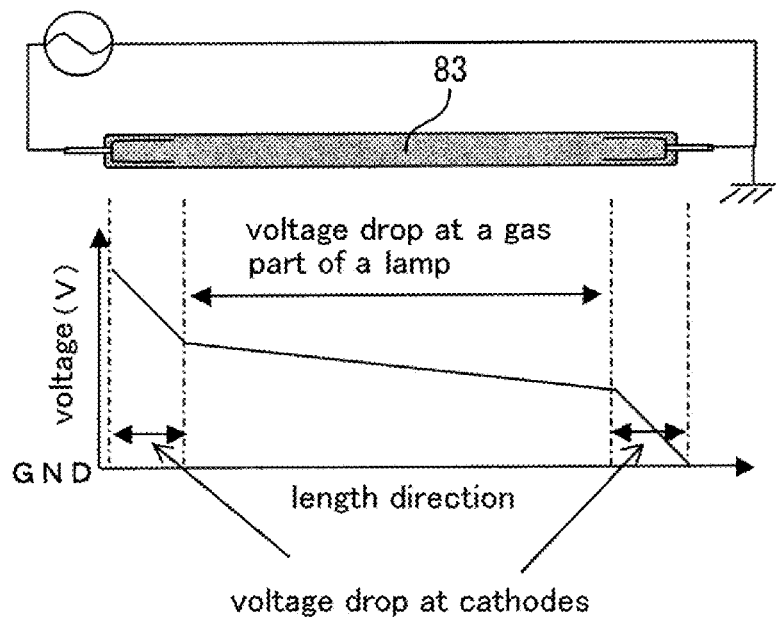
FIG. 10 is a graph showing the relationship between the length of a cold cathode fluorescent tube and voltage drop.

FIG. 5 shows a configuration in which the above-mentioned preferable configuration (5) of the present invention is applied to a lighting device of a direct type liquid crystal display device. In this configuration, the lighting device has a structure in which the lighting device has a reflective member 51 provided with a light-reducing treatment 51*a* on the side opposed to the display side of part of or all of a curved portion of a light source lamp 11, and is constituted such that part of or all of the curved portion of the light source lamp 11 is provided above a region provided with a light-reducing treatment 51*a* of the reflective member 51. The reflective member 51 provided with a light-reducing treatment 51*a* may be a reflective sheet with which the region with low light reflectance 51*a* which is gray, black, or the like, is provided.

In this case, the lighting device has a constitution in which the U-shaped curved portion of the U-shaped tube is provided above the region provided with the light-reducing treatment, and thereby the same optical property as in the case where a straight tube is used can be provided. As a result, excellent display quality can be provided without deterioration of specific advantages of the U-shaped tube.

In a further preferred embodiment, the U-shaped light source lamp in the first preferred embodiment described above is replaced with a pseudo-U-shaped light source lamp having a square U-shaped folded portion. That is, in this configuration, the lighting device has a structure in which part of or all of the square U-shaped part of the light source lamp is covered with a lamp frame that is capable of reducing or shielding light, and is constituted such that part of or all of the square U-shaped part of the light source lamp is stored in a conventionally used lamp frame. Therefore, the same functional effects as in the first preferred embodiment can be obtained in the present preferred embodiment.

In a further preferred embodiment, the U-shaped light source lamp in the second preferred embodiment described above is replaced with a pseudo-U-shaped light source lamp having a square U-shaped folded portion. That is, in this configuration, the lighting device for liquid crystal display devices is configured by laminating and disposing an optical member above the light source lamp such that part of or all of the square U-shaped part of the light source lamp is covered with the part provided with the light-reducing or light-shielding treatment of the optical member. Therefore, the same functional effects as in the second preferred embodiment can be achieved in the present preferred embodiment.

In another preferred embodiment, the U-shaped light source lamp in the third preferred embodiment described above is replaced with a pseudo-U-shaped light source lamp having a square U-shaped folded portion. That is, in this configuration, the lighting device for liquid crystal display devices is configured to have a structure in which part of or all of the square U-shaped part of the light source lamp is disposed outside an effective display region. Therefore, the same functional effects as in third preferred embodiment can be obtained in the present preferred embodiment.

In an additional preferred embodiment, the U-shaped light source lamp in the fourth preferred embodiment described above is replaced with a pseudo-U-shaped light source lamp having a square U-shaped folded portion. That is, in this configuration, the lighting device for liquid crystal display devices is configured to have a structure in which a member for reducing or shielding light is provided with part of or all of the square U-shaped part of the light source lamp. Therefore, the same functional effects as in the fourth preferred embodiment can be obtained in the present preferred embodiment.

In another preferred embodiment, the U-shaped light source lamp in the fifth preferred embodiment described above is replaced with a pseudo-U-shaped light source lamp having a square U-shaped folded portion. That is, in this configuration, the lighting device has a structure in which the lighting device has a reflective member provided with light-reducing treatment on the side opposed to the display side of part of or all of the square U-shaped part of the light source lamp, and part of or all of the square U-shaped part of the light source lamp is disposed above the region provided with the light-reducing treatment of the reflective member. Therefore, the same functional effects as in the fifth preferred embodiment can be obtained in the present preferred embodiment.

The present application claims priority under 35 U.S.C. §119 (a) on Japanese Patent Application No. 2004-3076 filed in Japan on Jan. 8, 2004, entitled "LIGHTING DEVICE FOR DISPLAY DEVICES, LIQUID CRYSTAL DISPLAY DEVICE AND LIGHT SOURCE LAMP", the entire contents of which are herein incorporated by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A display device comprising:
   a display panel including a display region;
   a plurality of light source lamps arranged to emit light toward the display region, each of the plurality of the light source lamps including a folded portion or a curved portion located at least partially outside of the display region and arranged along to an edge of the display panel; and
   a reflective surface underlying the light source lamps, the reflective surface including a first region with a first reflectance located in an area extending along said edge of the display panel and outside of the display region, and a second region with a second reflectance higher than the first reflectance.

2. The display device according to claim 1, wherein the second region includes a highly reflective resin and the first region includes sheet metal.

3. The display device according to claim 2, wherein the highly reflective resin is disposed on the sheet metal.

4. The display device according to claim 1, wherein the folded portion or curved portion of each of the light source lamps is located completely outside of the display region.

5. The display device according to claim 1, further comprising a frame including a portion arranged to protect at least a portion of the folded portion or curved portion of each of the light source lamps from deformation and to cover said at least a portion of the folded portion or curved portion of each of the light source lamps so as to reduce or shield light emitted from the folded portion or curved portion toward the display region.

6. The display device according to claim 5, wherein the portion of the frame is arranged to protect and cover all of the folded portion or curved portion of each of the light source lamps.

7. The display device according to claim 5, wherein the frame is made of a resin that is capable of reducing or shielding transmission of light.

8. The display device according to claim 5, further comprising a plurality of holders each arranged to hold the curved portion or folded portion of a respective one of the light source lamps and arranged to be covered by the portion of the frame.

9. The display device according to claim 1, wherein each of the light source lamps has a substantially U-shaped configuration.

10. The display device according to claim 1, wherein the display device is a direct-type liquid crystal display device.

* * * * *